(12) United States Patent
Velusamy

(10) Patent No.: US 9,094,808 B2
(45) Date of Patent: *Jul. 28, 2015

(54) METHOD AND SYSTEM FOR PROVIDING NOTIFICATIONS OF A MOBILE DEVICE IN MOTION TO DETERMINE CALL TREATMENT

(71) Applicant: Verizon Patent and Licensing Inc., Arlington, VA (US)

(72) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,358

(22) Filed: Apr. 14, 2014

(65) Prior Publication Data

US 2014/0228007 A1 Aug. 14, 2014

Related U.S. Application Data

(63) Continuation of application No. 13/302,804, filed on Nov. 22, 2011, now Pat. No. 8,698,621.

(51) Int. Cl.
| | | |
|---|---|---|
| *G08B 1/08* | (2006.01) | |
| *H04W 4/16* | (2009.01) | |
| *H04M 1/663* | (2006.01) | |
| *H04M 1/725* | (2006.01) | |
| *H04M 3/48* | (2006.01) | |
| *H04W 76/02* | (2009.01) | |
| *H04M 1/60* | (2006.01) | |

(52) U.S. Cl.
CPC ............... *H04W 4/16* (2013.01); *H04M 1/663* (2013.01); *H04M 1/72569* (2013.01); *H04M 3/48* (2013.01); *H04W 76/02* (2013.01); *H04M 1/6075* (2013.01)

(58) Field of Classification Search
CPC ............... B60R 11/02; B60R 11/0241; B60R 2011/001; B60R 2011/0059; B60R 2011/0071; G06K 9/00248; G06K 9/3208; G06Q 30/00; G07C 2009/00095; G07C 2009/00769; G07C 9/00087; G07C 9/00309; G10L 17/005
USPC ............ 340/539.11, 436, 933, 425.5, 539.13, 340/539.19, 539.22, 539.26
See application file for complete search history.

(56) References Cited

U.S. PATENT DOCUMENTS

| | | | |
|---|---|---|---|
| 8,594,738 B2* | 11/2013 | Cook et al. ..................... 455/565 |
| 8,698,621 B2* | 4/2014 | Velusamy ................ 340/539.11 |
| 2005/0250551 A1* | 11/2005 | Helle .............................. 455/567 |
| 2009/0146813 A1* | 6/2009 | Nuno .......................... 340/572.1 |
| 2009/0201270 A1* | 8/2009 | Pikkujamsa et al. .......... 345/184 |
| 2010/0056208 A1* | 3/2010 | Ashida et al. ............... 455/556.1 |
| 2011/0298829 A1* | 12/2011 | Stafford et al. ............... 345/659 |

* cited by examiner

*Primary Examiner* — Daniel Previl

(57) ABSTRACT

An approach for providing vehicle accident prevention service is described. A user device in motion is detected. An alert message indicating that the user device is in motion is generated. A determination is made whether to establish a communication session with the user device in response to the generated alert message.

20 Claims, 11 Drawing Sheets

METHOD AND SYSTEM FOR PROVIDING NOTIFICATIONS OF A MOBILE DEVICE IN MOTION TO DETERMINE CALL TREATMENT

CROSS REFERENCE TO RELATED APPLICATIONS

This application is a continuation of U.S. application Ser. No. 13/302,804 filed Nov. 22, 2011, the entirety of which is incorporated herein.

BACKGROUND INFORMATION

Modern telecommunications services, particularly those relating to wireless mobile communication devices (e.g., cellular phones), are ubiquitous as more and more users continue to adopt these services. Unfortunately, the operation of such devices while operating a moving vehicle poses significant danger to the operator and the general public. For example, it has been reported that numerous deaths have resulted from vehicle accidents stemming from cell phone distractions. Existing approaches have largely put the onus on the cellular phone users to minimize the driving distractions by requiring the use of hands-free operations technology or headsets. Moreover, the severity of this distracted driving problem has prompted many local governments to pass ordinances to deter users from operating cellular phones.

Based on the foregoing, there is a need for an approach that minimizes the distraction to users of mobile devices in the establishment of communications during situations in which safety is compromised.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing notifications of a mobile device in motion to determine call treatment are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various embodiments are described with respect to a cellular device, it is contemplated that these embodiments have applicability to any mobile device capable of communicating over a network using various technologies.

Figure 1A:
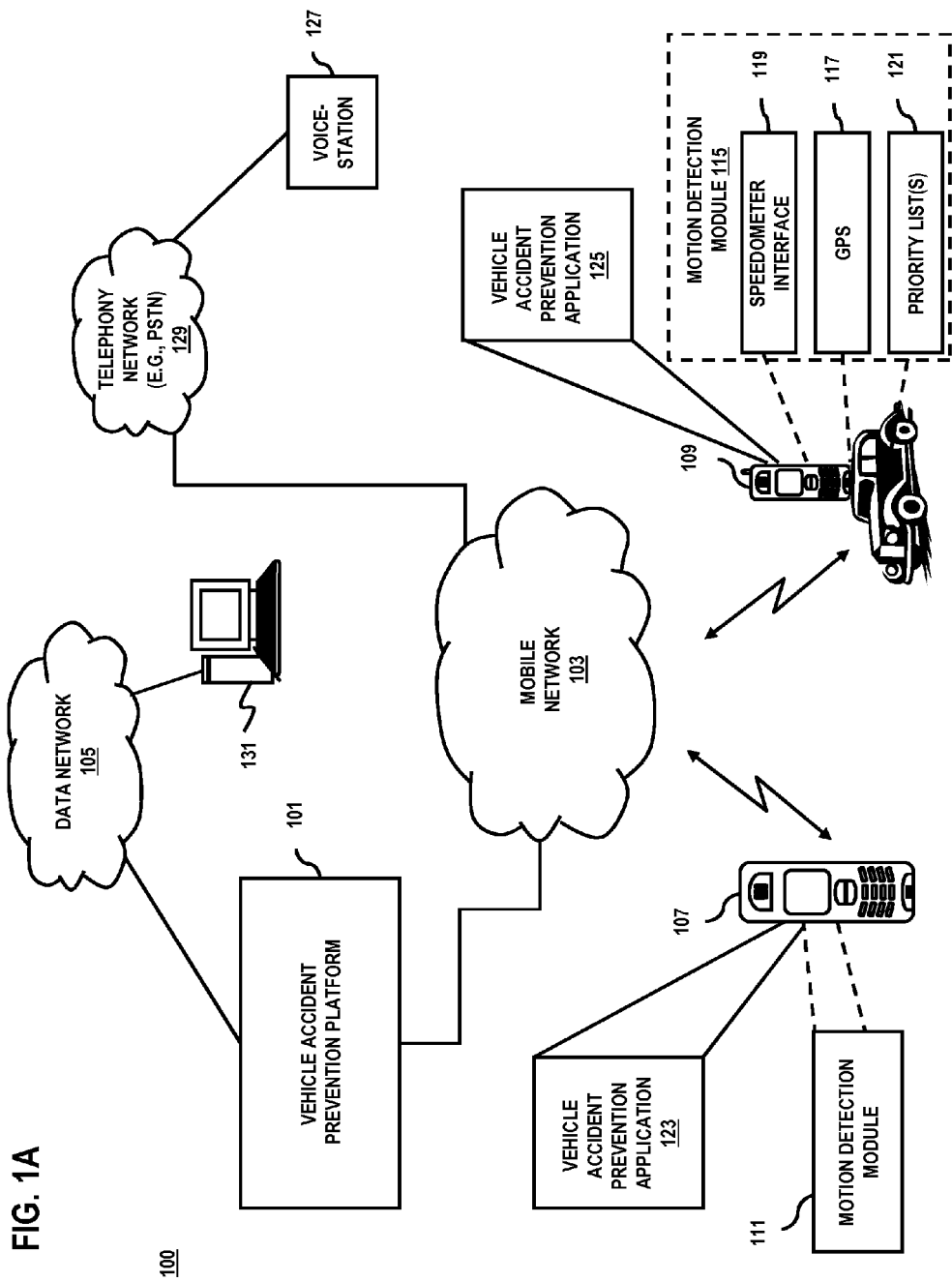
FIGS. 1A and 1B are, respectively, a diagram of a system capable of providing vehicle accident prevention services, and a flowchart of a process for establishing communications via the vehicle accident prevention services, according to various embodiments.
Figure 1B:
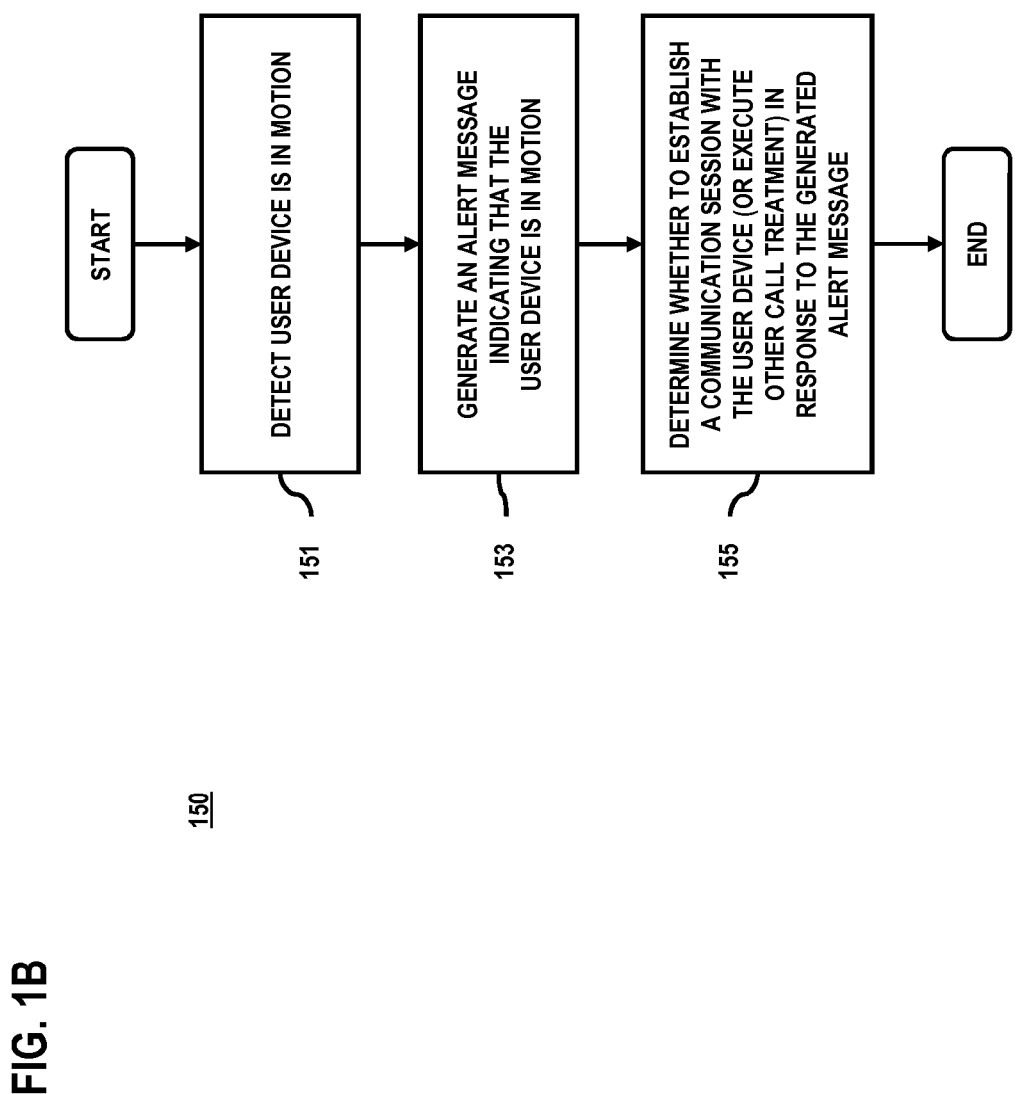

FIGS. 1A and 1B are, respectively, a diagram of a system capable of providing vehicle accident prevention service, and a flowchart of a process for establishing communications via the vehicle accident prevention service, according to various embodiments. For the purposes of illustration, a mechanism for providing vehicle accident prevention services is described with respect to a communication system 100 that includes a vehicle accident prevention platform 101, which interfaces with mobile network 103 and a data network 105. It is noted that data network 105 can be a separate autonomous system or provided as part of the mobile network 103. Also, these networks 103 and 105 can be operated by a common service provider or separate service providers. Moreover, the vehicle accident prevention platform 101 can be yet a different service provider (or a provider that can supply either of the services of network 103 or network 105). According to certain embodiments, the services of platform 101 can be provided as a managed service to various user devices, e.g., mobile devices 107 and 109. In certain embodiments, the vehicle accident prevention platform 101 may effectively reside within one or both of mobile devices 107 and 109 to function without intervention from a service provider network and/or operator, making the application "network-agnostic" (i.e., all core functions of the vehicle accident prevention platform 101 are implemented within each communication device via the vehicle accident prevention applications 123 and 125 instead of on the network). This configuration also enables the vehicle accident prevention platform 101 to be deployable directly to each communication device without requiring dedicated network resources.

As noted, the problem of distracted driving has caused great alarm as mobile devices and their associated operations (e.g., placing voice calls, texting, emailing, etc.) while driving continue to result in needless risk of life. In recognition of this growing problem, the vehicle accident prevention platform 101 can reduce the number of vehicle accidents by informing callers that the called party is driving. In this way, the caller is put on notice and prompted to determine whether the urgency of the call is sufficient to place the recipient driver at risk. Consequently, this mechanism is effective in that typical callers are likely to think twice if they know that their call can compromise the safety of the person they are trying to reach. Furthermore, users themselves may reflect more intensely in making/receiving calls while driving, if their colleagues and family members begin to place fewer calls during times when the users are involved with activities requiring greater concentration and attention for their safety and the safety of others.

In certain embodiments, user devices 107 and 109 can include motion detection modules 111 and 113, respectively, to determine that the devices 107 and 109 are in fact in a state of motion that may compromise user safety (due to distractions) if the users engage in communications using the devices 107 and 109. According to one embodiment, user device 109 employs a motion detection module 115 can include a global positioning satellite (GPS) receiver 117, a speedometer interface 119, and one or more priority lists 121. GPS receiver 117 can assist with the generation of location information for the user device 109. Speedometer interface 119 can acquire speed information of the vehicle to which the user device 109 is affixed to or is within. The speed information may be obtained through communicating with the instrumentation panel of the vehicle or directly with the speedometer, for example. Such communication with the instrumentation panel may be wireless—e.g., via a BLUETOOTH connection.

Also, motion detection module 115 may maintain priority list(s) 121 to specify callers whose calls need to be placed through, irrespective of whether the device 109 is in motion. That is, the callers are given greater priority such that their calls are not to be blocked or otherwise filtered. According to one embodiment, the lists 121 can be organized by categories of callers (e.g., co-workers, family members, friends, etc.) and activated independently.

As shown, each of the mobile devices 107 and 109, in certain embodiments, executes a vehicle accident prevention application (e.g., applications 123 and 125) to support communication with the user and platform 101. Applications 123 and 125 can operate with the respective motion detection modules 111 and 115 to provide call treatment for calls destined for the mobile devices 107 and 109 based on whether the devices 107 and 109 are moving (e.g., particularly if the user is driving). For instance, application 123 associated with user device 107 can determine (solely or in conjunction with platform 101) whether user device 107 is moving at a rate of speed as to suggest that the device 107 is being utilized within a motorized vehicle (e.g., greater than 25 MPH). Alternatively, platform 101 can receive data from application 123 to make this determination.

By way of example, voice-station 127 seeks to communicate with mobile device 107 over telephony network 129, but is notified by vehicle accident prevention platform 101 that device 107 is moving at a high rate of speed, and thus, is likely to be operating the device 107 in an automobile. The specific rate of speed can be a configurable value specified by the user or a default value set by the service.

FIG. 1B illustrates a flowchart of a process for establishing communications via the vehicle accident prevention service. Under this scenario, a caller (either using host 131, mobile 109, and voice station 127) is attempting to communicate with the user of mobile device 107. Process 150 detects that mobile device 107 is in motion, per step 151. This detection can be performed by device 107 via motion detection module 111 alone or in conjunction with application 123 and platform 101. The motion detection module 111 may include an accelerometer (not shown) that senses acceleration of the device 107 and a GPS receiver to monitor location points. Accordingly, velocity or movement of device 107 can be readily tracked. It is contemplated other techniques can be utilized to detect movement of mobile device 107 can be employed. In addition, the user may manually specify parameters relating to the motion state of device 107 by indicating so via application 123; for example, the user may be prompted by the application 123. These parameters can specify a movement duration threshold value for the duration of time the device 107 needs to be moving to conclude that the device 107 is in a motion state. Also, another threshold value (denoted as a stop duration threshold value) can be additionally defined to account for the potential breaks or temporary pauses in movement. For instance, the mobile device 107 can be in a vehicle that is driving through city traffic in which the car starts and stops frequently. The use of these two thresholds can avoid a false detection that the user device 107 is no longer in a vehicle. It is contemplated that platform 101 can maintain movement patterns that reflect the behavior of different movement methods, such as automobiles, bicycles, a person walking or running, etc. Through refining the detection of these patterns, platform 101 can more accurately indicate that the user device 107 is in fact associated with a user in a moving vehicle.

In step 153, process 150 generates an alert message indicating that the user device 107 is in motion. In certain embodiments, the alert message can further specify user information about the user device, and the user information includes either current location information of the user device, timing information relating to the detected motion, information about the vehicle, information relating to driving habits of a user of the device, or a combination thereof. Moreover, default generic messages may be utilized: "The called party is in a moving vehicle." Alternatively, customized messages may be specified. For instance, the pre-created messages may be "Joe is currently driving-placing the call now is not safe at this point-would you still like the call to go through?," "Joe will be at your location in 10 minutes-would you still like the call to go through?," etc. The alert message, in certain embodiments, may also be determined as to what type of communication to use for example, SMS, MMS, IM, electronic mail, whether to include location information, and whether to send location updates periodically. Each message can have a different set of recipients and the recipient can create multiple priority lists.

The alert message can be provided as part of the call establishment procedure, whereby an indicia (e.g., prompt, tone, aural message, etc.) is provided to clearly convey that the called party is in motion. Alternatively, the alert message may be "out-of-band" in form of a text message or an instant message so that the caller can simply "hang-up." The alert message may include a default message to indicate the target device is moving and possibly in a vehicle; the message may also specify the location of the device 107. In this manner, the caller may determine that the user of device 107 is nearby, and thus, the caller can wait for the user's arrival (assuming the caller is expecting to meet up with the user), rather than possibly endangering the called party.

Next, process 150 determines whether to establish a communication session (e.g., voice call) with the user device 107 in response to the generated alert message (per step 155). That is, the caller can decide whether the call is critical enough to distract the recipient while driving. However, the caller can elect other call treatments; e.g., such treatments may involve initiating a call back, leaving a voice mail, or terminating the call. The call back option may provide the caller with a notification to call back the device 107 at a later time once the device 107 is no longer in the motion state. Alternatively, the call can be placed on hold until the device 107 comes to a complete stop for a predetermined duration, for instance.

In certain embodiments, additional call processing logic can be provided by platform 101. According to one embodiment, calls that are deemed missed because the user device 107 was detected to be in motion can be tracked and automatically called back (e.g., in sequence).

Thus, process 150 can advantageously remove the distraction of having to communicate using device 107 while the user is engaged in an activity that requires greater attention to safety—e.g., operating a motorized vehicle.

Although process 150 is described with respect to establishment of a voice call, it is contemplated that the vehicle accident prevention service of platform 101 can prevent the completion of any type of communication session upon detection of movement of the subject user device. For example, the communication session can include various messaging services, such as short message service (SMS), multimedia service (MMS), instant messaging (IM), electronic mail, etc.

Under the scenario of FIG. 1A, mobile devices 107 and 109 are configured to communicate using mobile network 103, which can then forward such communication to data network 105 as well as telephony network 129. The mobile devices 107 and 109 are illustrated as mobile (cellular) telephones, but may alternatively be other kinds of portable devices, such as personal digital assistants or communicators. In addition, mobile devices 107 and 109 may facilitate various input means for receiving and generating information, including touch screen capability, keyboard and keypad data entry, voice-based input mechanisms, accelerometer (e.g., shaking the mobile device 107 and 109), and the like. Any known and future implementations of mobile devices 107 and 109 are applicable. It is noted that, in certain embodiments, the mobile devices 107 and 109 may be configured to establish peer-to-peer communication sessions with each other using a variety of technologies—i.e., near field communication (NFC), BLUETOOTH, infrared, etc.

Mobile network 103 can be a wireless access and transport network, such as a cellular (2G, 3G, 4G, or above), 802.11, 802.15, 802.16, or satellite network; and may employ various mobile communication technologies including, for example, in cellular networks, global system for mobile communications/universal mobile telecommunication system (GSM/UMTS) technologies (i.e., 3GPP technologies) and code division multiple access (cdmaOne/CDMA2000) technologies (i.e., 3GPP2 technologies). In certain embodiments, data network 105 can be a local area network (LAN), which utilizes WiFi technology or other wireless technologies. The LAN may utilize the dynamic host configuration protocol (DHCP) to dynamically assign "private" DHCP internet protocol (IP) addresses to mobile device 107 as well computing device 131. It is contemplated that device 131 can be configured to execute a "soft" phone to establish voice communication sessions with other devices, e.g., mobile devices 107 and 109.

Alternatively, network 105 can be a metropolitan area network (MAN), or a wide area network (WAN) that interfaces other systems and/or networks; e.g., the Internet, or any other suitable packet-switched network, as well as a circuit switched telephony network 129—for example, a Public Switched Telephone Network (PSTN). Thus, voice station 127 is reachable by the various user devices 107, 109, and 131.

In certain embodiments, system 100 can provide packetized voice communications (e.g., Voice over Internet Protocol (VoIP)). Four possible scenarios exist with the placement of a VoIP call: (1) phone-to-phone, (2) phone-to-PC, (3) PC-to-phone, and (4) PC-to-PC. In the first scenario of phone-to-phone call establishment, voice station 127 is switched through PSTN 129 by a switch to a VOIP gateway (not shown), which forwards the call through the data network 105 (which may be an IP network) or the mobile network 103. Under the second scenario, a voice station places a call to PC through a switch to the PSTN 129. This voice call is then switched by the PSTN 129 to a VOIP gateway (not shown), which forwards the voice call to a PC via the data network 105. The third scenario involves a PC that places a call to a voice station. Using a voice encoder, the PC introduces a stream of voice packets into the IP network 105 that are destined for a VoIP gateway (not shown). The VoIP gateway (with the SIP provider cloud) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network 103 to another PC, where the packetized voice data is decoded.

By way of example, the packetized voice session is established using Session Initiation Protocol (SIP). A detailed discussion of SIP and its call control services are described in Internet Engineering Task Force (IETF) Request for Comment (RFC) 2543, entitled "SIP: Session Initiation Protocol"; RFC 3515, entitled "The Session Initiation Protocol (SIP) Refer Method"; RFC 3261, entitled "SIP: Session Initiation Protocol"; and RFC 3725, entitled "Best Current Practices for Third Party Call Control (3 pcc) in the Session Initiation Protocol (SIP)"; all of which are incorporated herein by reference in their entireties. SIP is used to create and terminate voice calls over a data network (e.g., network 105). However, it is understood that one of ordinary skill in the art would realize that the H.323 protocol and similar protocols can be utilized in lieu of SIP. The H.323 protocol, which is promulgated by the International Telecommunication Union (ITU), specifies a suite of protocols for multimedia communication. SIP is a signaling protocol that is based on a client-server model. It should be noted that both the H.323 protocol and SIP are not limited to IP telephony applications, but have applicability to multimedia services in general.

Since SIP can be used for signaling, a media session transported using schemes such as RTP (Reliable Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way.

The data network 105 permits host 131 to access functions and settings of the vehicle accident prevention messaging platform 101 via a graphical user interface (GUI) such as a browser application. As a result, the user of the vehicle accident prevention messaging service can input and update settings and configurations for the user's particular device through a web browser or through the communication device itself (e.g., mobile devices 107 and 109).

Figure 2:
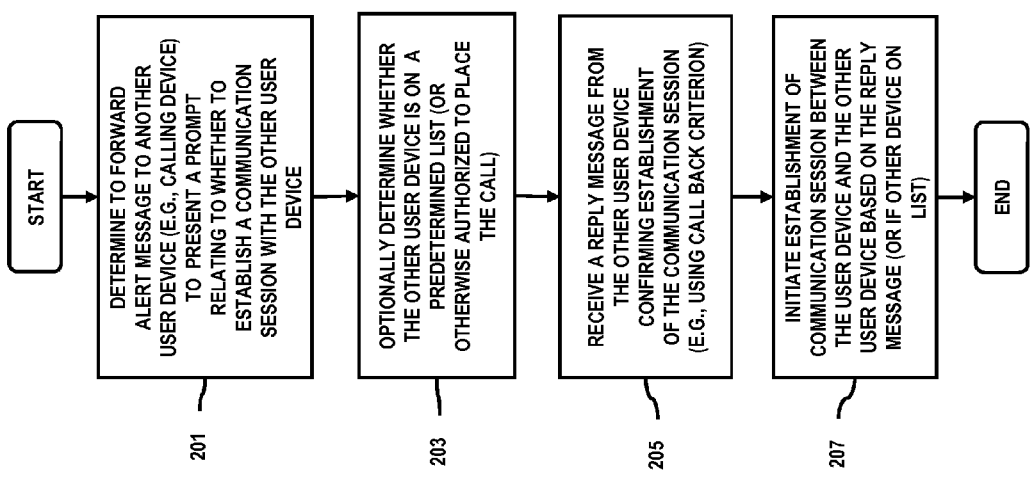
FIG. 2 is a flowchart of a process for notifying a calling party of a user device in motion, according to one embodiment.

FIG. 2 is a flowchart of a process for notifying a calling party of a user device in motion, according to one embodiment. It is noted that the steps of the process of FIG. 2 may be performed in any suitable order, as well as combined or separated in any suitable manner. Continuing with the example of FIG. 1B, process 200 provides that the generated alert message be forwarded to another user device (e.g., mobile device 109) participating in the communication session (step 201). The user device 109 is configured to present a prompt relating to whether to establish the communication session. The communication session can be a voice call or a text message, for instance. Process 200 can optionally determine whether the device 109 is on a predetermined list ("priority list") or is otherwise authorized to place the call without blocking or filtering (step 203).

In step 205, a reply message is received from device 109 confirming establishment of the communication session. In step 207, process 200 initiates establishment of the communication session between the user device 107 and the other user device 109 in response to the reply message. However, the establishment of the communication session can occur automatically without waiting for a reply if the other device 109 is on the priority list; in which case, the reply message is not needed. Alternatively, the reply message can still be utilized to override the priority list.

According to one embodiment, process 200 can be executed by platform 101 in conjunction with the vehicle accident prevention applications 123 and 125.

Figure 3:
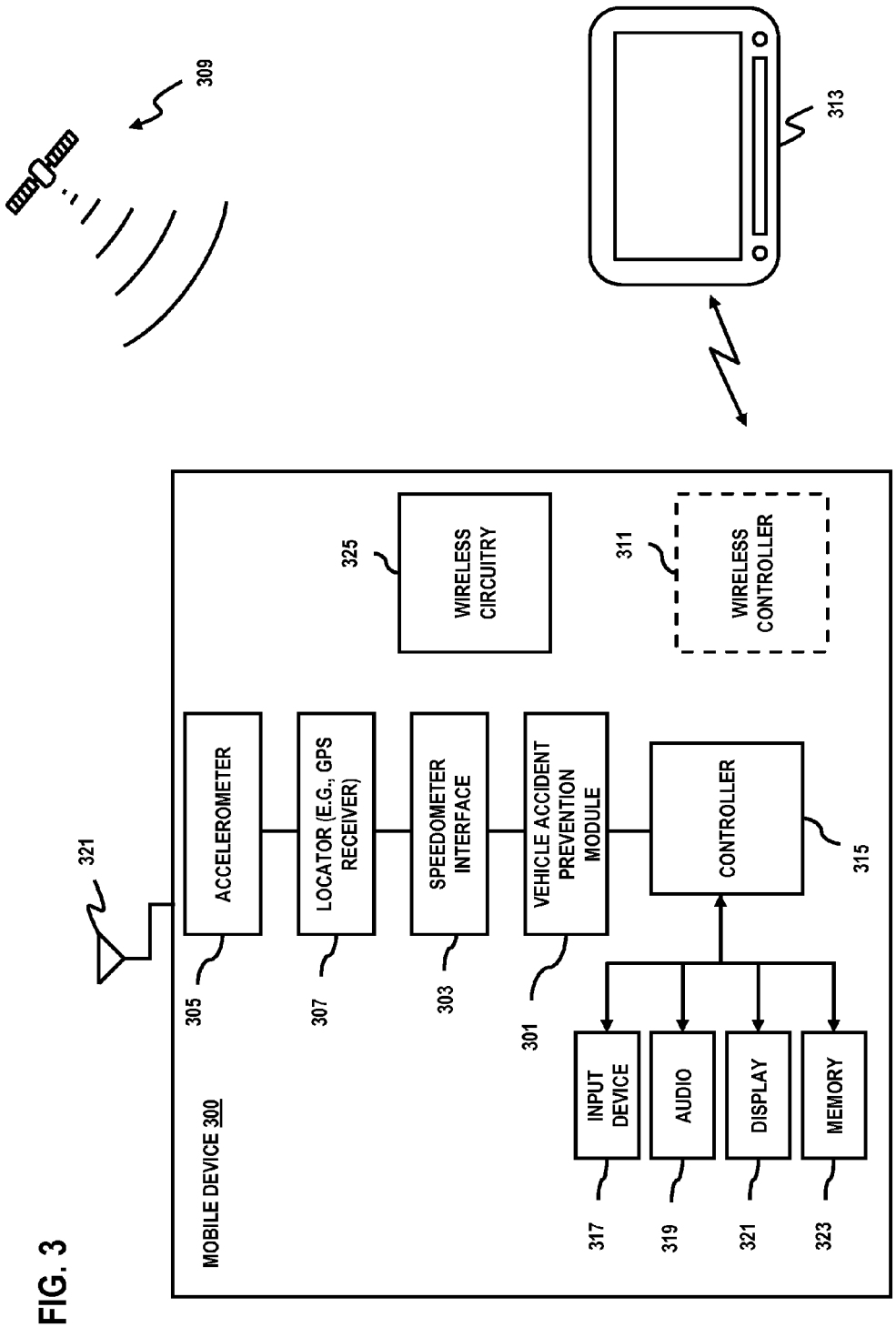
FIG. 3 is a diagram of a mobile device configured to facilitate vehicle accident prevention services, according to an exemplary embodiment.

FIG. 3 is a diagram of a mobile device including a vehicle accident prevention messaging module, according to an exemplary embodiment. As shown, mobile device 300 includes a vehicle accident prevention module 301, which can execute the functions associated with the vehicle accident prevention application described in system 100. Accordingly, module 301 can provide the user interface for the mobile device 300 to interact with platform 101. Alternatively, module 301 can execute the vehicle accident prevention service as a standalone on the device-side (as opposed to a network-side implementation).

Mobile device 300 also includes speedometer interface 303 to communicate with a vehicle's computer system to acquire information relating to speed of the vehicle. In addition, speed information may be sensed from an accelerometer 305.

Further, mobile device 300 provides a locator 307 to determine the location of the mobile device 300. By way of example, the locator 307 includes a GPS receiver that receives position data from multiple GPS satellites 309. At any point on Earth, the locator 307 can receive signals from multiple satellites 309. Specifically, locator 307 may determine three-dimensional geolocation (or spatial positioning information) from signals obtained from, for instance, at least four satellites 309. Measurements from satellite tracking and monitoring stations located around the world are incorporated into orbital models for each satellite to compute precise orbital or clock data. GPS signals are transmitted over two spread spectrum microwave carrier signals that are shared by GPS satellites 309. Mobile device 300 needs to identify the signals from at least four satellites 309, decode the ephemeris and clock data, determine the pseudo range for each satellite 309, and compute the position of the receiving antenna. With GPS technology, mobile device 300 can determine its spatial position with great accuracy and convenience. It is contemplated that the various exemplary embodiments are also applicable to other equivalent navigational and location determination technologies. The position data is utilized by the vehicle accident prevention module 301 to provide location information that is automatically inserted into vehicle accident prevention messages at the user's option.

In addition (or alternatively), the mobile device 300 can be equipped with a wireless controller 311 to communicate with an external locator 313 (e.g., GPS device or a device utilizing other location-based technology) for acquisition of position data. The external GPS device can employ any number of standard wireless technologies to communicate with the wireless controller 311; for example, the external GPS device can use short range radio transmission technology, such as BLUETOOTH™. It is contemplated that other equivalent short range radio technology and protocols can be utilized. It also is contemplated that the external GPS device 313 may be a compatible stand-alone device, automobile navigation system, or other equivalent system.

A controller 315 is provided to control functions of an input device 317 (e.g., keyboard, touch screen, or other input mechanism), an audio function circuitry 319, a display unit 321, and a memory 323. A user can enter vehicle accident prevention messaging information using the input device 317. The audio function circuitry 319 provides audio cues to the user to support various applications and mobile device functions. Similarly, the display unit 321 provides a display to the user in support of various applications and mobile device functions. The memory 323 can store preconfigured vehicle accident prevention messages, distribution lists, allowed incoming devices lists, and preferences, and other variables for use by the vehicle accident prevention module 301. In addition, the mobile device 300 employs wireless circuitry 325 to communicate over the mobile network 103.

The controller 315 routes the digital signal into the DSP for processing therein, such as speech encoding, channel encoding, encrypting, and interleaving. The encoded signals are then routed to an equalizer for compensation of any frequency-dependent impairments that occur during transmission though the air such as phase and amplitude distortion. The signals may be forwarded from there to a remote telephone which may be another cellular telephone, other mobile phone or a landline connected to the Public Switched Telephone Network (PSTN) 129 (of FIG. 1A).

By way of example, the vehicle accident prevention module 301 can generate and transmit an alert message to the calling device to indicate that the mobile device 300 is in motion. The alert message can be transmitted using short message service (SMS), for example. Alternatively, this alert can be integrated with the appropriate call establishment procedure or protocol.

The vehicle accident prevention module 301 is also configured to determine the location of the mobile device 300 from locator 307 (or external device 313) and to display the current location information using display 321. Optionally, if set in tracking mode, the vehicle accident prevention module 301 can periodically send SMS messages with updated location information to the other mobile device (associated with the caller).

The receipt of such a message alerts the caller device; this can serve also as a prompt to enable the caller to determine whether the call should go through, even though the user of mobile device 300 is in motion (e.g., operating an automobile).

Figure 4:
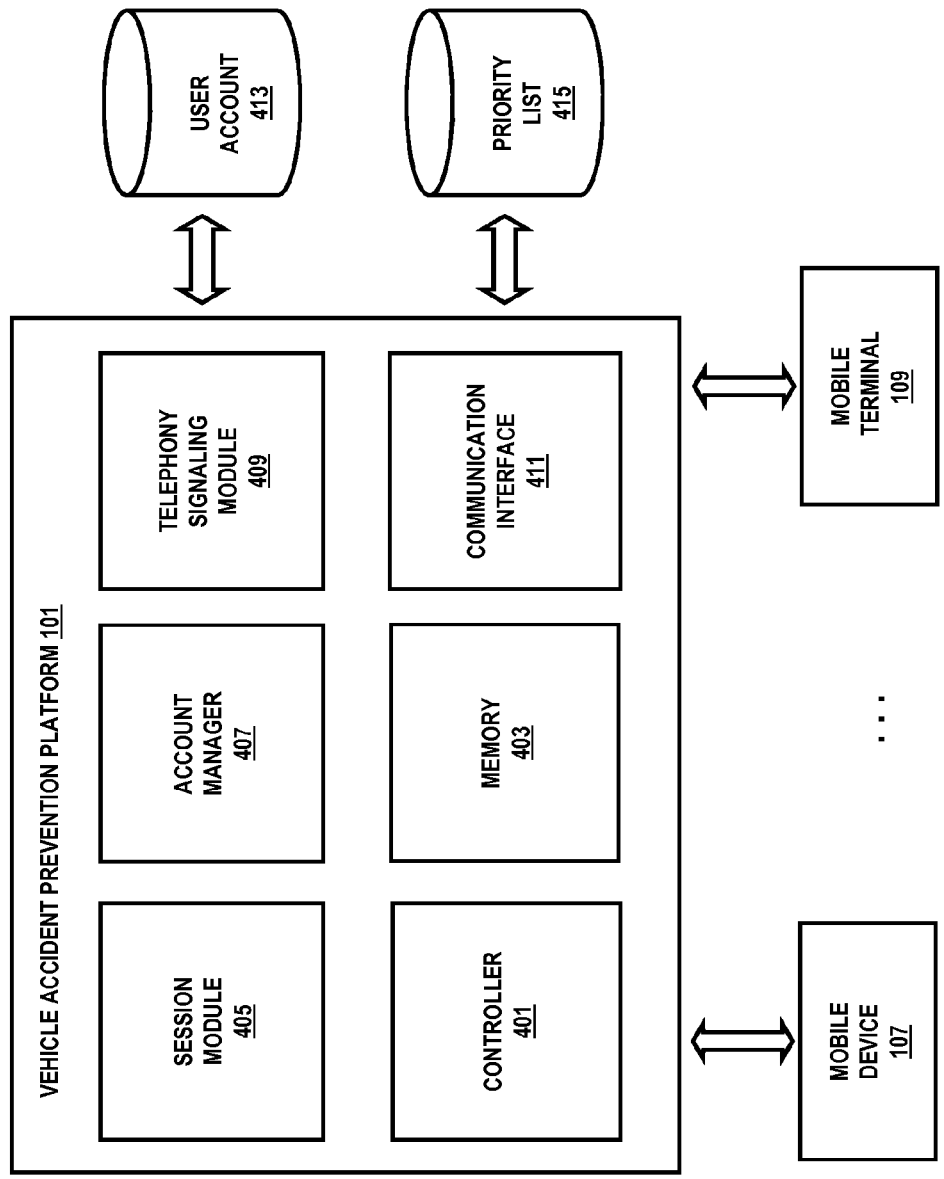
FIG. 4 is a diagram of a configuration platform utilized in the system of FIG. 1, according to an exemplary embodiment.

FIG. 4 is a diagram of the components of a vehicle accident prevention platform 101, according to an exemplary embodiment. By way of example, the vehicle accident prevention platform 101 may comprise computing hardware (such as described with respect to FIG. 8), as well as include one or more components configured to execute the processes described herein for providing vehicle accident prevention services. It is contemplated that the functions of these components may be combined in one or more components or performed by other components of equivalent functionality. In one implementation, the vehicle accident prevention platform 101 includes a controller (or processor) 401, memory 403, a session module 405, an account manager 407, a caching module 409, and a communication interface 411.

The controller 401 may execute at least one algorithm to perform functions of the vehicle accident prevention platform 101. For example, the controller 401 may interact with the session module 405 to monitor and detect mobile devices that are in motion, as well as assist with call control. If, for instance, the user device is in motion, the session module 405 may then generate an alert message cautioning the caller about possible safety concerns due to the movement of the caller's device.

Memory 403 can store preconfigured vehicle accident prevention messages, distribution lists, authorized incoming devices lists, and user preferences, and other variables for use by the vehicle accident prevention platform 101. Vehicle accident prevention messaging applications 123, and 125 are responsible for configuring, transporting, and authenticating vehicle accident prevention messages from platform 101 as well as other compatible devices.

When the session module 405 determines that the communication session has been established or a call back feature is invoked to subsequently set-up the communication session. Also, the session module 405 may operate with the account manager 407 to determine registration status of the user with the vehicle accident prevention service. If, for instance, the account manager 407 determines that the user is registered (e.g., the user is a subscriber), the session module 405 may then automatically initiate establishment of the communication session based on the alert message. In various embodiments, the vehicle accident prevention service may be completed using cached data associated with the service. In one use case, the caching module 409 may determine a cache status associated with the data, including whether the data (or portions of the data) is currently stored as cache data, prior to the establishment of the communication session. Caching of the data may then be initiated based on the cache status (e.g., caching data that is not currently stored). Thereafter, the controller 401 may operate in conjunction with the session module 405 and the caching module 409 to provide the cached data to complete the establishment of the communication session based on the alert message. On the other hand, the session module 405 may not initiate establishment of the communication session based on the alert message if the user is not a subscriber to the monitoring service, but instead prompt the user accordingly, or offer to subscribe the user.

The controller 401 may further utilize the communication interface 411 to communicate with other components of the system 100. The communication interface 411 may include multiple means of communication; e.g., short message service (SMS), multimedia messaging service (MMS), internet protocol, instant messaging, voice sessions (e.g., via a phone network), email, or other types of communication. According to one embodiment, such methods may be used to transmit messages or alerts to inform users of information indicating that the user device is in motion. These messages or alerts can then be utilized by the respective user devices (e.g., mobile devices 107, 109, 123 etc.) to generate notification messages including such information.

Figure 5:
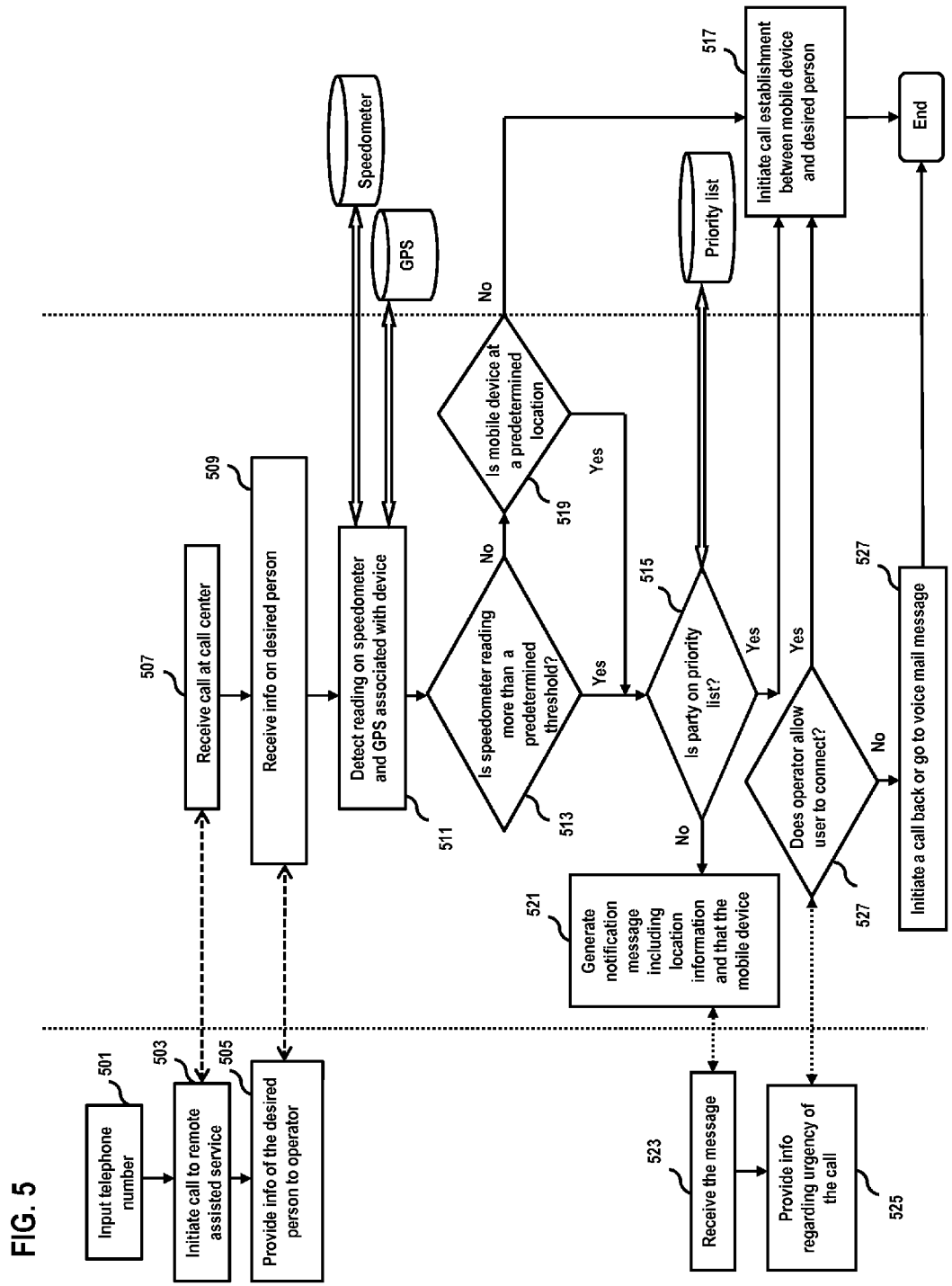
FIG. 5 is a flowchart of a process for providing various call treatments upon detecting a target mobile device being in motion, according to various embodiments.

FIG. 5 is a diagram of a process for notifying a caller about a called mobile device's being in motion via text messaging, according to an exemplary embodiment. Under this scenario, the vehicle accident prevention service is implemented as a network service (e.g., an operator assisted service), wherein the platform 101 is integrated with a data center, for example. For the purposes of illustration, mobile device 107 attempts to call mobile device 109, which is a cellular phone of a user who driving an automobile.

In step 501, a call attempt is initiated by the calling mobile device 107 to communicate with the mobile device 109 (which is executing the vehicle accident prevention application 125) via a remote assisted or operator service. The call can be associated with a predefined code or number (e.g., toll-free number) to signal to the network 103 that special call treatment is required. In step 503, the call is initiated from the mobile device 107 to the remote service for assisted vehicle accident prevention; as such, the call is handled by either a human operator or a voice response unit. Next, the caller can specify the name or number of the called person to the operator, per step 505.

In step 507, the call is received, for example, by a call center. The information about the person or phone number is obtained, per step 509. For example, the operator personnel at a call center can request the information of the desired communication party from the user of mobile device 107. In response, the user can provide the information about the desired party to the operator personnel. In this example, the call center can coordinate with the vehicle accident prevention platform 101 to initiate the detection of whether the phone number corresponds to a mobile device (e.g., device 109) and whether such device 109 is in a motion state that would trigger the appropriate prompts relating to call establishment. Specifically, speed information and location information can be acquired, as in step 511, using, respectively, speedometer readings from the vehicle that is transporting the mobile device 109 and the GPS receiver of the mobile device 109 (or an external GPS receiver of the vehicle). Next, the speed information of the vehicle (effectively the mobile device 109) can be compared with a predetermined threshold (e.g., 15 mph) to determine what is a "safe" speed to conduct a phone call; the threshold can be a default value or user configured. Also, such predetermined threshold can be based on a particular location for a given time.

If the threshold is satisfied, it is then determined whether the caller is on a priority list (step 523). If the caller is on the priority list, then the call can be established (step 517).

Returning to step 513, if the predetermined threshold is not satisfied, then an optional check is to determine whether the mobile device 109 is at or near (within a configurable proximity) of a predetermined location (e.g., home), as in step 519. Moreover, the location information can be used in the notification or alert message forwarded to the caller; for example, the caller can thus decide whether to wait for the person to arrive at the destination to communicate rather than compromise that person's safety. It is noted that the speedometer reading may be below the predetermined threshold since the vehicle may be temporarily slowing down or is about to stop (e.g., at a stop sign or a traffic light). The threshold value may be accompanied with a timing parameter (i.e., how long the device has been below the threshold) to avoid placing the call through when it is expected that the device 109 will imminently be in motion.

In step 521, it is determined that the recipient is not in the priority list, a notification message is generated and can include an indication that the target device 109 is in motion and location information. At the calling device 107, the notification message is received via, e.g., SMS, or verbally from the operator. In step 525, the caller may indicate the urgency of the call to permit the operator to override the "blocking" or to convey such information to the target device 109.

In certain embodiments, the vehicle accident prevention platform 101 may prompt the operator whether the operator would permit the caller to connect, as in step 527, in consideration of the urgent nature of the call. If the operator decides that no communications is desired because the device 109 is in motion, then various call treatment options can be provided to the caller. The operator may, for instance, have received explicit instructions by the user of the mobile device 109 not to put any calls through unless the caller is on the priority list. For example, per step 527, call back can be initiated or the caller is provided with the option to leave a voice mail.

Figure 6:
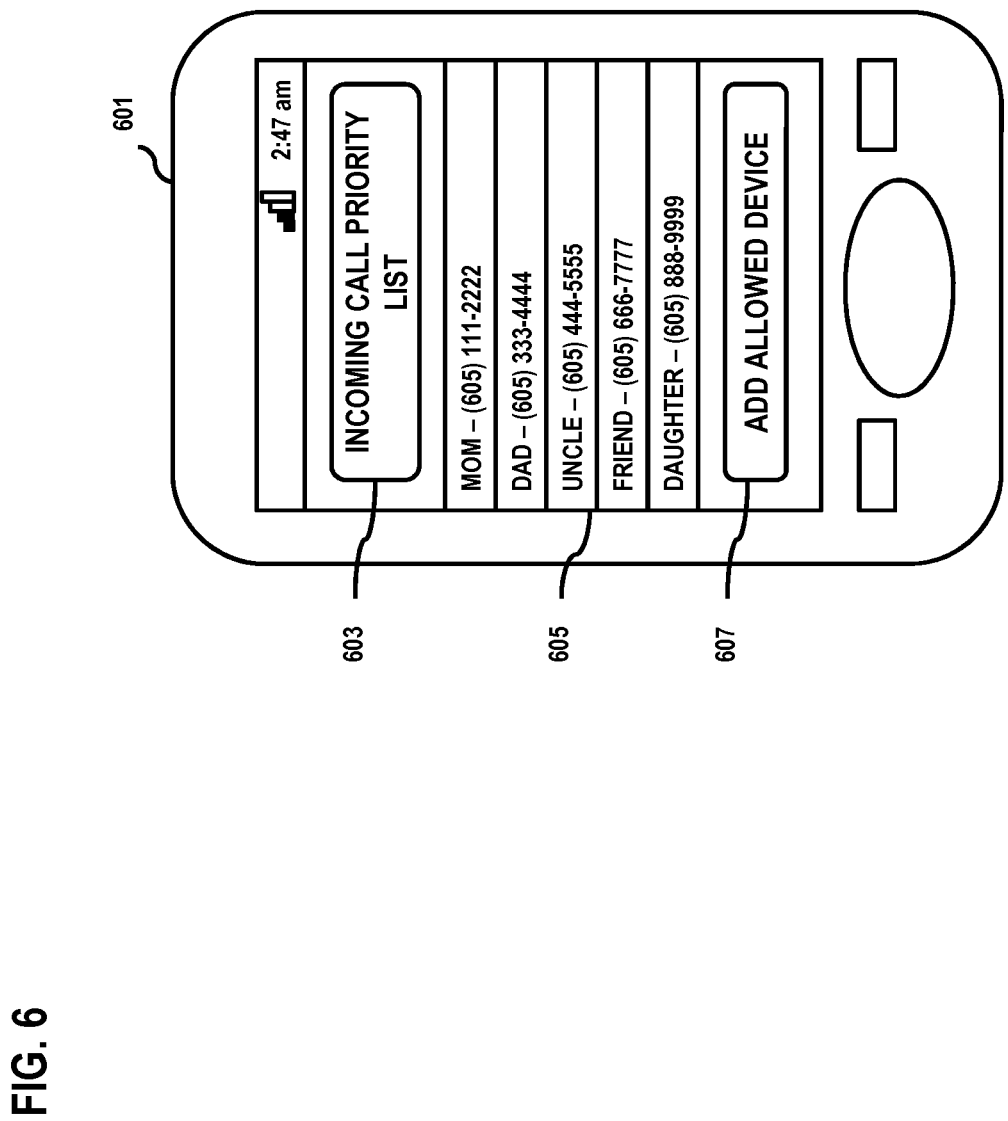
FIG. 6 is a diagram of a graphical user interface (GUI) for configuring a priority list for the vehicle accident prevention service, according to one embodiment.

FIG. 6 is a diagram of a graphical user interface (GUI) for configuring a priority list for the vehicle accident prevention service, according to one embodiment. User interface screen 501 is an exemplary user interface screen that enables creation of a priority list by the user (e.g., subscriber) using the mobile device 109. Alternatively, the configuration of the priority list can be set using computing device 131. Screen 601 includes a text box 603 that indicates that the screen pertains to the call priority list. Section 605 displays the current members of the list; such members are permitted to communicate with the subscriber even if the device is in motion. A soft button 607 is provided to add other members to this list. It is contemplated that other control functions can be utilized to manipulate the list—e.g., an edit function, a delete function, etc.

Figure 7A:
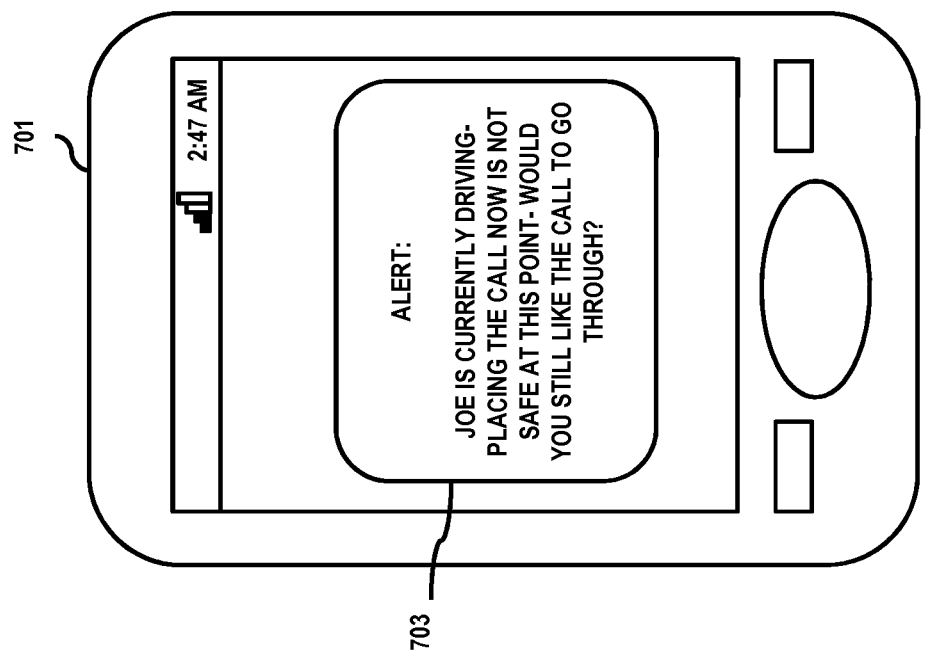
FIGS. 7A-7C are diagrams of exemplary screens of a graphical user interface (GUI) in support of vehicle accident prevention services, according to various exemplary embodiments.
Figure 7C:
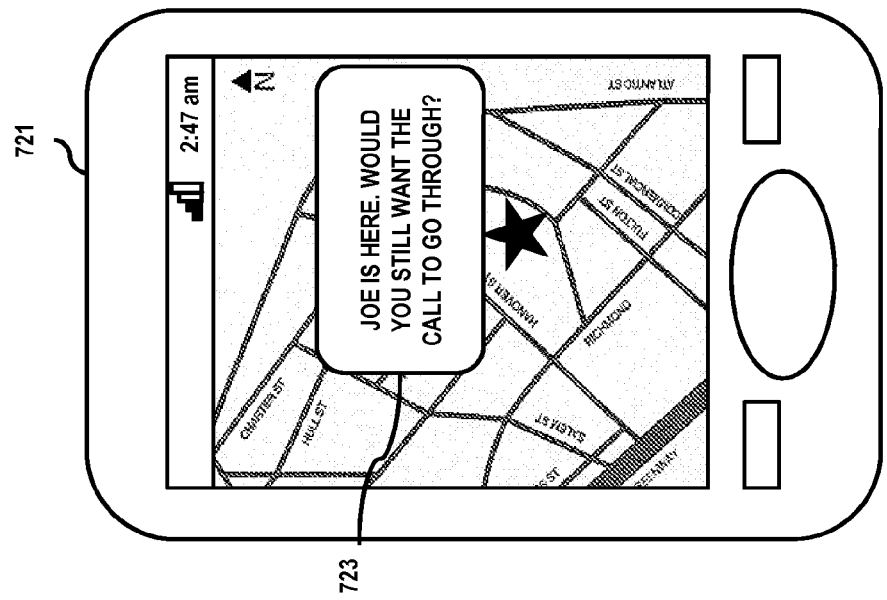
Figure 7B:
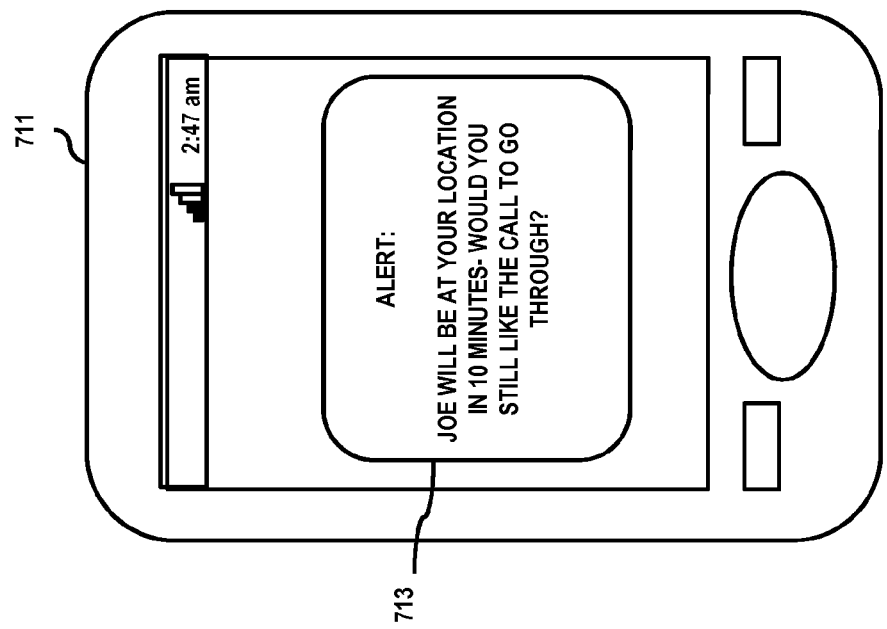

Moreover, it is contemplated that the option to add members (as well as the other functions) may be actuated by other means such as a hard button, key combination, etc. In one embodiment, the platform 101 also stores this list FIGS. 7A-7C are diagrams of exemplary screens of a graphical user interface (GUI) in support of vehicle accident prevention services, according to various exemplary embodiments. As seen in FIG. 7A, a calling device can present interface screen 701 that presents an alert message within text box 703 to indicate that the called party is possibly driving, as the called device has been detected to be in a motion state. In addition, a prompt is provided to ask the user whether the call should be established anyway. This alert/notification message within box 703 can provide any content (in any configurable format—e.g., including visual indicia) that conveys the fact that the called party is not in an environment that is safe to operate the user's mobile device. By way of, the screen 701 may use other means to alert the user, such as changing of screen colors (foreground and/or background), an icon, etc. Also, the device can produce other types of indicators—e.g., playing an audio alert, and/or vibrating.

Other information, such as location related information of the called party, can also be provided, as shown in FIGS. 7B and 7C. With screen 711 (of FIG. 7B), text box 713 notifies the user that the called party, Joe, is nearby, but also provides a prompt to determine whether the subscriber wishes to complete the call nevertheless.

If platform 101 provides location information, the subscriber device via screen 721 can display visually where the called device is on a map. Text box 723 provides notification that the called party is at this location, and prompts the subscriber about completion of the call (as seen in FIG. 7C). It is noted that the content and format of the screens 701, 711, and 721 may be interchanged or reformatted in any configuration depending on, for example, preference of the subscriber.

As evident from the described processes and arrangements, certain embodiments provide a host of advantages. For example, safety in the use of mobile devices is greatly enhanced by reducing the number of calls to the user from the callers' side. Additionally, both callers and called parties are inherently trained to consider driver safety before making non-urgent calls.

The processes described herein for providing vehicle accident prevention services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
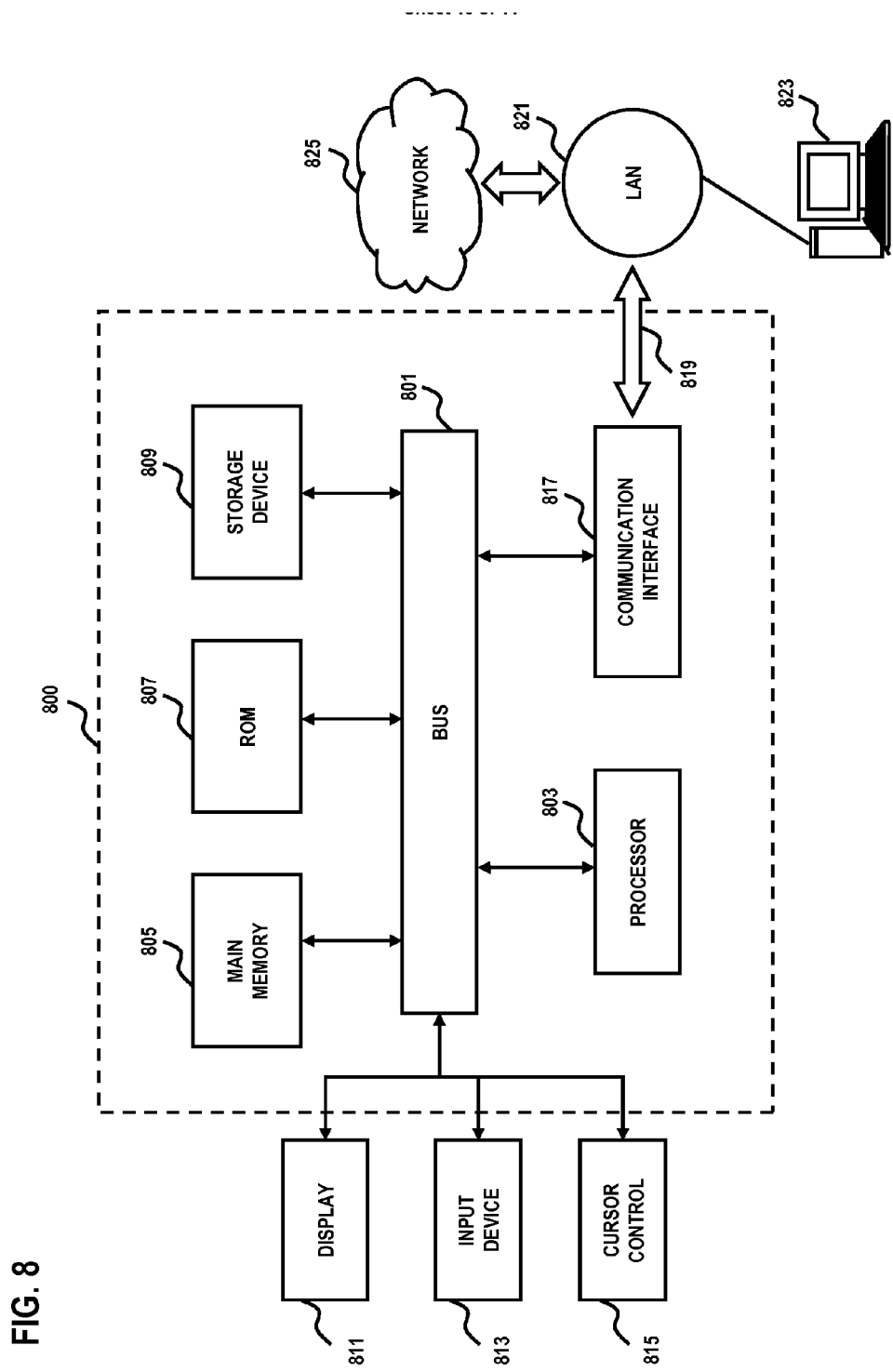
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
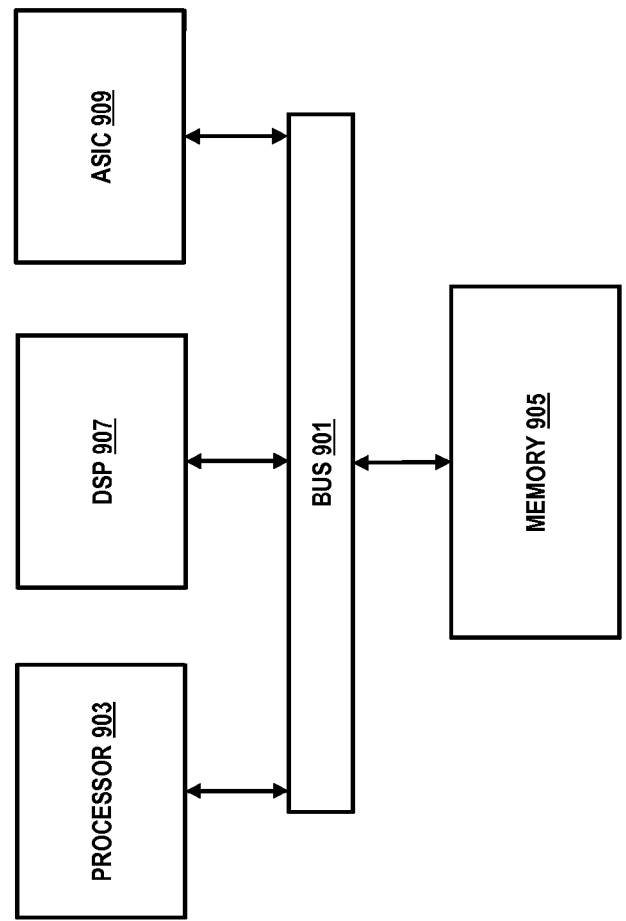
FIG. 9 is a diagram of a chip set that can be used to implement various exemplary embodiments.

FIG. 9 illustrates a chip set or chip 900 upon which an embodiment of the invention may be implemented. Chip set 900 is programmed to enable providing remote control and vehicle accident prevention services as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling incomplete action monitoring and service for data transactions.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable incomplete action monitoring and service for data transactions. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrange

What is claimed is:

1. A method comprising:
generating a message indicating that a first user device is in motion;
forwarding the message indicating that the first user device is in motion to a second user device that has requested establishment of a communication session with the first user device; and
determining to establish the communication session with the first user device by the second user device in response to the message;
wherein the second user device is configured to present a prompt, to the user of the second user device, for a reply relating to whether to establish the communication session; and
wherein the second user device is further configured to transmit a reply message in response to the user of the second user device indicating that the user of the second user device wishes to establish the communication session.

2. A method according to claim 1, further comprising:
receiving the reply message from the second user device confirming establishment of the communication session; and
initiating establishment of the communication session between the first user device and the second user device in response to the reply message.

3. A method according to claim 2, further comprising:
determining whether second user device that has requested establishment of the communication session is on a predetermined list authorized to establish the communication session with the first user device while in motion.

4. A method according to claim 2, wherein the reply message from the second user device specifies establishment of the communication session based on a call back criterion, the method further comprising:
determining whether the call back criterion is satisfied.

5. A method according to claim 1,
wherein the first user device is within a vehicle, the detected motion relating to the motion of the vehicle,
wherein the first user device is detected to be in motion when the motion of the vehicle exceeds a predetermined speed threshold, and
wherein, after the first user device is detected to be in motion, the first user device is detected as not in motion when the motion of the vehicle is less than the predetermined speed threshold for a predetermined time period.

6. A method according to claim 5, wherein the message specifies user information about the first user device, and the user information includes either current location information of the first user device, timing information relating to the detected motion, information about the vehicle, information relating to driving habits of a user of the first user device, or a combination thereof.

7. A method according to claim 1, wherein communication session includes a voice call or a text message.

8. An apparatus comprising:
at least one processor; and
at least one memory including computer program code for one or more programs,
the at least one memory and the computer program code configured to, with the at least one processor, cause the apparatus to perform at least the following,
generate a message indicating that a first user device is in motion;
forward the message indicating that the first user device is in motion to a second user device that has requested establishment of a communication session with the first user device; and
determine to establish the communication session with the first user device by the second user device in response to the message;
wherein the second user device is configured to present a prompt, to the user of the second user device, for a reply relating to whether to establish the communication session; and
wherein the second user device is further configured to transmit a reply message in response to the user of the second user device indicating that the user of the second user device wishes to establish the communication session.

9. An apparatus according to claim 8, wherein the apparatus is further caused to:
receive the reply message from the second user device confirming establishment of the communication session; and
initiate establishment of the communication session between the user device and the other user device in response to the reply message.

10. An apparatus according to claim 9, wherein the apparatus is further caused to:
determine whether another user device that has requested the establishment of another communication session is on a predetermined list authorized to establish the communication session with the user device while in motion.

11. An apparatus according to claim 9, wherein the reply message specifies the establishment of the communication session based on a call back criterion, the method further comprising:
determining whether the call back criterion is satisfied.

12. An apparatus according to claim 8,
wherein the first user device is within a vehicle, the detected motion relating to the motion of the vehicle,
wherein the first user device is detected to be in motion when the motion of the vehicle exceeds a predetermined speed threshold, and
wherein, after the first user device is detected to be in motion, the first user device is detected as not in motion when the motion of the vehicle is less than the predetermined speed threshold for a predetermined time period.

13. An apparatus according to claim 12, wherein the alert message specifies user information about the first user device, and the user information includes either current location information of the first user device, timing information relating to the detected motion, information about the vehicle, information relating to driving habits of a user of the first user device, or a combination thereof.

14. An apparatus according to claim 8, wherein communication session includes a voice call or a text message.

15. A non-transitory computer-readable storage medium carrying one or more sequences of one or more instructions which, when executed by one or more processors, cause an apparatus to at least perform the following steps:
generate a message indicating that a first user device is in motion;
forward the message indicating that the first user device is in motion to a second user device that has requested establishment of a communication session with the first user device; and
determine to establish the communication session with the first user device by the second user device in response to the message;

wherein the second user device is configured to present a prompt, to the user of the second user device, for a reply relating to whether to establish the communication session; and wherein the second user device is further configured to transmit a reply message in response to the user of the second user device indicating that the user of the second user device wishes to establish the communication session.

16. A non-transitory computer-readable storage medium claim 15, wherein the apparatus is further caused to:
receive the reply message from the second user device confirming establishment of the communication session; and
initiate establishment of the communication session between the user device and the other user device in response to the reply message.

17. A non-transitory computer-readable storage medium according to claim 16, wherein the apparatus is further caused to:
determine whether another user device that has requested the establishment of another communication session is on a predetermined list authorized to establish the communication session with the user device while in motion.

18. A non-transitory computer-readable storage medium according to claim 16, wherein the reply message specifies the establishment of the communication session based on a call back criterion, the method further comprising:
determining whether the call back criterion is satisfied.

19. A non-transitory computer-readable storage medium according to claim 15,
wherein the first user device is within a vehicle, the detected motion relating to the motion of the vehicle,
wherein the first user device is detected to be in motion when the motion of the vehicle exceeds a predetermined speed threshold, and
wherein, after the first user device is detected to be in motion, the first user device is detected as not in motion when the motion of the vehicle is less than the predetermined speed threshold for a predetermined time period.

20. A non-transitory computer-readable storage medium according to claim 19, wherein the alert message specifies user information about the first user device, and the user information includes either current location information of the first user device, timing information relating to the detected motion, information about the vehicle, information relating to driving habits of a user of the first user device, or a combination thereof.

* * * * *